(12) United States Patent
Mather et al.

(10) Patent No.: US 9,713,817 B2
(45) Date of Patent: Jul. 25, 2017

(54) COATING MATERIAL SPRAY GUN

(71) Applicant: NORDSON CORPORATION, Westlake, OH (US)

(72) Inventors: Brian Mather, North Olmsted, OH (US); Jeffrey A. Perkins, Amherst, OH (US)

(73) Assignee: Nordson Corporation, We, OH (US)

( * ) Notice: Subject to any disclaimer, the term of this patent is extended or adjusted under 35 U.S.C. 154(b) by 0 days.

(21) Appl. No.: 14/978,061

(22) Filed: Dec. 22, 2015

(65) Prior Publication Data

US 2016/0121352 A1    May 5, 2016

Related U.S. Application Data

(62) Division of application No. 14/052,919, filed on Oct. 14, 2013, now Pat. No. 9,227,209, which is a division
(Continued)

(51) Int. Cl.
| | | |
|---|---|---|
| *B05B 9/01* | (2006.01) |
| *B05B 12/00* | (2006.01) |
| *B05B 5/03* | (2006.01) |
| *B05B 5/053* | (2006.01) |
| *G05G 1/01* | (2008.04) |
| *G05G 1/04* | (2006.01) |
| *B05B 5/047* | (2006.01) |
| *B05B 5/16* | (2006.01) |

(Continued)

(52) U.S. Cl.
CPC ............ *B05B 12/002* (2013.01); *B05B 5/032* (2013.01); *B05B 5/053* (2013.01); *B05B 9/01* (2013.01); *B05B 12/008* (2013.01); *G05G 1/01* (2013.01); *G05G 1/04* (2013.01); *B05B 5/047* (2013.01); *B05B 5/1683* (2013.01); *B05B 7/1486* (2013.01); *B05B 15/025* (2013.01)

(58) Field of Classification Search
CPC  B05B 9/01; B05B 5/032; B05B 5/053; B05B 12/002; B05B 12/008; B05B 5/047; B05B 5/1683; B05B 7/1486; B05B 15/025; G05G 1/01; G05G 1/04
USPC ....... 239/525, 526, 527, 528, 113, 706, 704, 239/708, 112; 334/48; 200/512
See application file for complete search history.

(56) References Cited

U.S. PATENT DOCUMENTS 4,220,443 A * 9/1980 Bear ..................... F41H 9/02
                                                      42/1.08
4,475,689 A   10/1984 Hauger et al.
(Continued)

FOREIGN PATENT DOCUMENTS

DE       10232869 A1   1/2004
EP        0899015 A1   3/1999
(Continued)

OTHER PUBLICATIONS

European Application No. 15197745.1: Extended European Search Report dated Apr. 11, 2016, 11 pages.
(Continued)

*Primary Examiner* — Justin Jonaitis
(74) *Attorney, Agent, or Firm* — Baker & Hostetler LLP

(57) ABSTRACT

Control method and apparatus for a manual spray gun may include a second manually actuated trigger disposed on the spray gun handle, with the second trigger being operational to select one or more coating operation parameters.

20 Claims, 8 Drawing Sheets

Related U.S. Application Data of application No. 11/981,118, filed on Oct. 31, 2007, now Pat. No. 8,584,973.

(51) Int. Cl.
*B05B 7/14* (2006.01)
*B05B 15/02* (2006.01)

(56) References Cited

U.S. PATENT DOCUMENTS

| | | | |
|---|---|---|---|
| 4,736,871 A * | 4/1988 | Luciani | B65D 51/248 222/25 |
| 5,829,681 A | 11/1998 | Hamel et al. | |
| 6,375,094 B1 * | 4/2002 | Schroeder | B05B 5/032 239/113 |
| 6,585,173 B2 | 7/2003 | Schmon et al. | |
| 6,622,937 B2 | 9/2003 | Schroeder et al. | |
| 7,322,534 B2 * | 1/2008 | Bartsch | B01J 47/002 239/302 |
| 7,611,074 B2 * | 11/2009 | Chen | B05B 9/01 239/525 |
| 7,793,869 B2 | 9/2010 | Mather et al. | |
| 8,584,973 B2 | 11/2013 | Mather et al. | |
| 2003/0089587 A1 | 5/2003 | Mayo et al. | |
| 2004/0256487 A1 | 12/2004 | Collins, Jr. et al. | |
| 2005/0127201 A1 | 6/2005 | Matsumoto | |
| 2008/0029615 A1 | 2/2008 | Davies et al. | |

FOREIGN PATENT DOCUMENTS

| | | |
|---|---|---|
| EP | 0899016 A2 | 3/1999 |
| EP | 1504823 A1 | 2/2005 |
| EP | 2055391 A2 | 5/2009 |
| JP | 11128781 | 5/1999 |
| JP | 11179251 | 7/1999 |
| JP | 2007502705 A | 2/2007 |
| WO | 03022449 A1 | 3/2003 |
| WO | 2004043848 A1 | 5/2004 |
| WO | 2005018823 A2 | 3/2005 |
| WO | 2006073307 A1 | 7/2006 |

OTHER PUBLICATIONS

Bravo Product Literature, Wagner-Systems, Germany, Date: Unknown, all pages.
Optiflex Product Literature, ITW Gema, Indianapolis, Indiana, Best Available Copy, Date: Unknown, all pages.
MACH-JET Product Literature, SAMES Technologies, France, Date: Unknown, all pages.
Partial European Search Report dated Dec. 7, 2011, for corresponding European Patent Application No. 08253451.2.
European Search Report dated Mar. 23, 2012, for corresponding European Patent Application No. 08253451.2.
Office Action dated Aug. 1, 2013, for corresponding Japanese Patent Application No. 2008-2806646.

* cited by examiner

COATING MATERIAL SPRAY GUN

CROSS-REFERENCE TO RELATED APPLICATIONS

This U.S. Patent Application is a divisional of U.S. patent application Ser. No. 14/052,919, filed Oct. 14, 2013, which is a divisional of U.S. patent application Ser. No. 11/981,118 filed on Oct. 31, 2007, the entire disclosures of which are fully incorporated herein by reference.

TECHNICAL FIELD OF THE DISCLOSURE

The disclosure relates to the art of applying material onto surfaces, such as for example, spraying or coating a surface with a coating material. More particularly, the disclosure and inventions relate to arrangements and methods for controlling a material application device such as, for example, a spray gun.

BACKGROUND

Powder coating material such as powder paint is commonly applied to an object by spraying the powder coating material. Typically, a spray gun or material application device is used, and spray guns may be manually held and operated or automatic spray guns may be used that are controlled electronically. For manual spray guns, a trigger type device is commonly disposed on the handle so that an operator can finger actuate the trigger to start and stop a coating operation. It is known to provide a separate trigger or switch on the spray gun handle to initiate a purge operation.

Spray technologies include for example electrostatic, non-electrostatic and tribo-electric. The powder flow path through a spray gun must be purged whenever the powder coating material, such as its color or other characteristic, is changed, in order to prevent unwanted contamination. In addition, various parameters are commonly changed for different parts being coated or when different coating materials are used. Such changeovers result in lost production time.

SUMMARY OF THE DISCLOSURE

The present disclosure presents a number of inventive aspects for both apparatus and methods relating to controlling a coating material application device. In accordance with one inventive aspect of the disclosure, a selection or auxiliary device is provided that allows an operator to select one or more coating operation parameters either before, during, between or after coating operations, or in one embodiment, during operation of the material application device including optionally during a coating material operation. In one embodiment, the device may be realized in the form of a manually actuated device that may be used to make adjustments or selections or changes to one or more coating operation parameters. In an exemplary embodiment, the manually actuated device may be in the form of a finger actuated trigger disposed on a handgrip of a manually operated spray gun. Examples of coating operation parameters may include but not limited to flow rate of the coating material, flow rate of the air that produces a flow of coating material, and preset coating operation recipes. The manually actuated device may be in addition to a second manually actuated device disposed on the handgrip such as for example a second trigger that may be used, as one example, to control the on/off operation of the material application device. Functionality associated with actuation of the auxiliary device may be programmable for specific control features desired in particular applications and uses.

In accordance with another inventive aspect of the disclosure, a first controller function may be provided that is associated with a material application device, such as a controller disposed in or on or with a material application device. A second controller function may also be provided that is external or remote from the material application device, such as for example a system controller function that controls operation of various components including but not limited to one or more pumps, feed centers, vibrators, overspray recovery systems, spray booth related controls and so on. The first controller and second controller may communicate with each other, for example over a network, so that a selection or auxiliary device functions to control the one or more coating operation parameters. For example, a trigger may be used to adjust flow rate of the coating material from a spray gun. In another embodiment, the second controller may be used to program or update the software for the first controller. The second controller may optionally be used to change or program the functionality that is associated with actuation of the selection or auxiliary device.

The disclosure also contemplates methods embodied in the use of such apparatus. The disclosure further presents inventive methods including a method for controlling a coating material application system that includes a material application device that is manually held and operated during a coating operation, the method in one embodiment including the steps of manually holding a handgrip of the material application device with one hand, and using the same hand while gripping the material application device to select at least one coating operation parameter.

Further inventive aspects, advantages and benefits will become apparent to those skilled in the art after considering the following description in conjunction with the accompanying drawings.

DETAILED DESCRIPTION OF EXEMPLARY EMBODIMENTS

Figure 1:
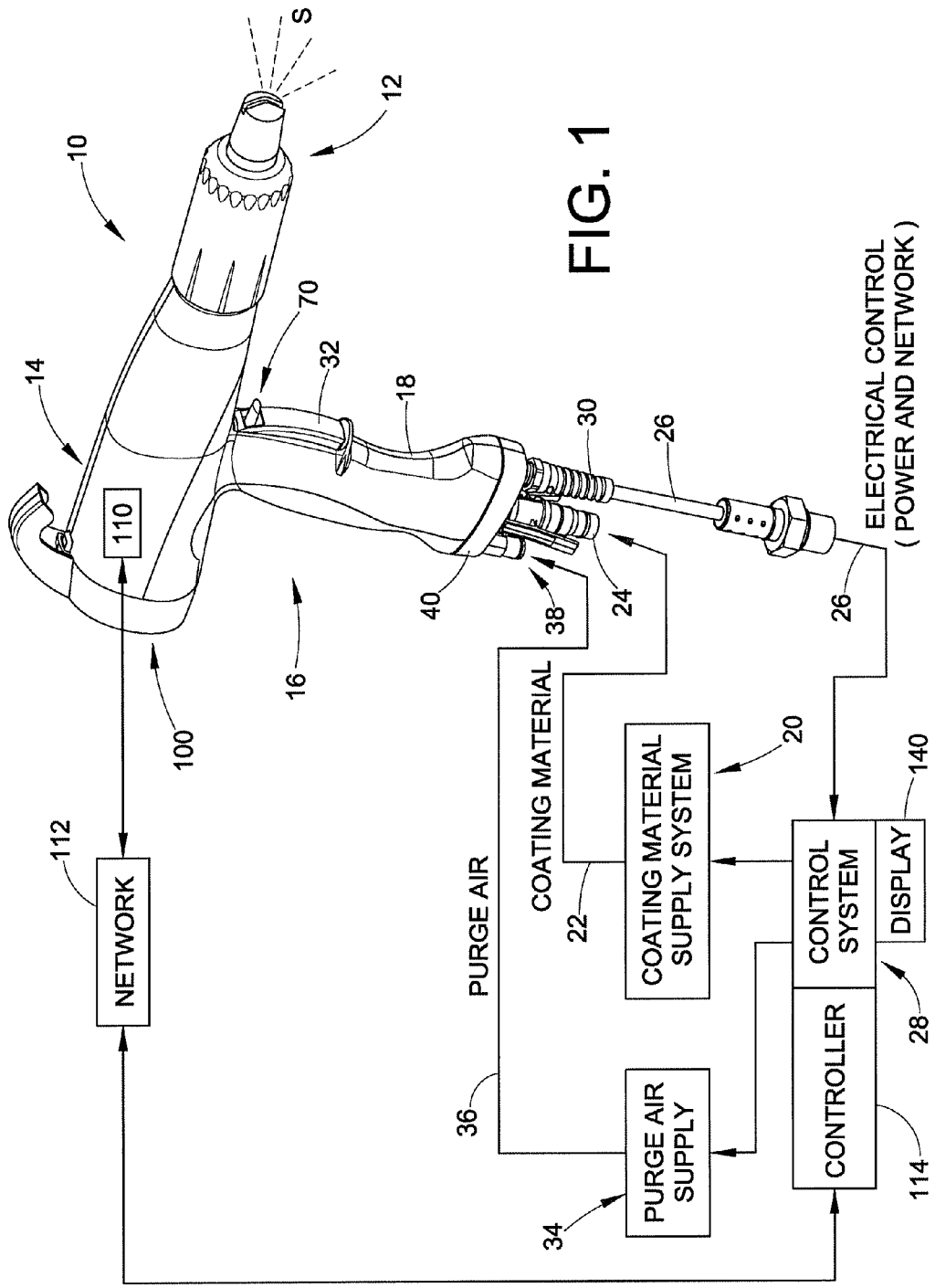
FIG. 1 is an isometric illustration of one embodiment of a material application device, in a material application system, that incorporates one or more inventive aspects of the present disclosure.

The inventions described herein are explained and illustrated in the context of a powder coating material application device, such as, for example, an electrostatic powder spray gun. However, the exemplary embodiments are not intended to be a limitation on the application or use of the various inventive aspects presented in this disclosure. For example, the inventions may be used with non-electrostatic material application devices and with tribo-charging guns that do not utilize an electrode, or combinations thereof. The inventions also are not limited to any particular type or use of coating material. Additionally, the terms 'spray' and 'spray pattern' are intended to be understood in their broadest meaning to include not only those processes commonly referred to as 'spray' or 'spraying' but additionally any application technique involving the directing of a generally dry particulate coating material across a space towards a target. The spray pattern may be but need not be atomized. When used, atomization may be based on pressure, air, or both or other atomization techniques and combinations thereof. Still further, the terms 'spray' and 'spray patterns' are not to be limited to any particular time duration that the material is directed towards the target. In other words, very short bursts of material or narrow jets of material are still to be construed as falling within the understanding herein of the word 'spray' and 'spray pattern'. While the inventions are also described and illustrated herein with reference to an exemplary spray gun configuration, shape and arrangement, nothing herein should be construed as limiting the inventions o such embodiments. Many different configurations and designs may be used, far too many to identify or describe herein.

As used herein, a purge operation refers to stopping flow of coating material from a material supply to a material application device, and applying pressurized purge air through part or all of the coating material flow path to remove as much of the coating material from the flow path as can be achieved for a given purging system design. As used herein, a coating operation refers to a set of events and/or various steps and operations that occur in order for a coating material to be applied to one or more objects. Thus the term coating operation is generally inclusive of one or more, and typically many, operations, functions, settings and conditions that determine the application of material to an object. For example, but not by way of limitation, a coating operation may include supply pump operation, spray booth and overspray recovery operations, conveyor system control, electrostatic control functions, material flow rates, atomization and flow air control, coating material characteristics and so on. For any particular coating operation then, there may be as few as one, but typically many parameters that are controlled or set, or in many cases are adjusted when coating operations are changed. These coating operation parameters may include but are not limited to, for example, voltage and current for electrostatic operations, coating material flow rates, air flow rates, purge timing and flow, as well as many other operations, functions, settings and conditions related to a coating operation. Therefore, the term coating operation parameter should be broadly construed as referring to any information, control, function, input, output, operation, setting, condition or feature related to a coating operation that affects or influences a coating operation. The various parameters or subsets thereof, associated with a specific coating operation are generally referred to herein as recipes or coating operation recipes, and such recipes are typically, though need not be, predetermined and stored in memory for access by a main control system which controls the various system components to execute a coating operation in accordance with a selected recipe. Usually recipes are fixed as far as a line operator is concerned, but some systems may be designed to permit recipe changes and other variations by any personnel with proper authority to make such changes. Thus as used herein, recipe is not intended to be limited to a set of parameters that cannot be changed, but may include recipes in which one or more parameters, instructions, controls and functions may be changed. The term recipe thus also includes recipes that are predetermined or preset, as well as recipes that are put together on a more real time basis before a coating operation, or modified prior to a coating operation.

While various inventive aspects, concepts and features of the inventions may be described and illustrated herein as embodied in combination in the exemplary embodiments, these various aspects, concepts and features may be used in many alternative embodiments, either individually or in various combinations and sub-combinations thereof. Unless expressly excluded herein all such combinations and sub-combinations are intended to be within the scope of the present inventions. Still further, while various alternative embodiments as to the various aspects, concepts and features of the inventions—such as alternative materials, structures, configurations, methods, circuits, devices and components, software, hardware, control logic, alternatives as to form, fit and function, and so on—may be described herein, such descriptions are not intended to be a complete or exhaustive list of available alternative embodiments, whether presently known or later developed. Those skilled in the art may readily adopt one or more of the inventive aspects, concepts or features into additional embodiments and uses within the scope of the present inventions even if such embodiments are not expressly disclosed herein. Additionally, even though some features, concepts or aspects of the inventions may be described herein as being a preferred arrangement or method, such description is not intended to suggest that such feature is required or necessary unless expressly so stated. Still further, exemplary or representative values and ranges may be included to assist in understanding the present disclosure; however, such values and ranges are not to be construed in a limiting sense and are intended to be critical values or ranges only if so expressly stated. Moreover, while various aspects, features and concepts may be expressly identified herein as being inventive or forming part of an invention, such identification is not intended to be exclusive, but rather there may be inventive aspects, concepts and features that are fully described herein without being expressly identified as such or as part of a specific invention, the scope of the inventions instead being set forth in the appended claims or the claims of related or continuing applications. Descriptions of exemplary methods or processes are not limited to inclusion of all steps as being required in all cases, nor is the order that the steps are presented to be construed as required or necessary unless expressly so stated.

With reference to FIG. 1, a manually operated material application device 10 may include a nozzle portion 12, a barrel portion 14 and a handgrip portion 16. In the examples herein, the device 10 may be, for example, any suitable material application device or spray gun. The terms spray gun and material application device are used herein interchangeably, however, it is to be understood that a material application device may be realized in many forms other than just a spray gun and is not limited to that terminology. Typically, the nozzle portion 12, barrel portion 14 and handgrip portion 16 are each multi-piece assemblies, and also separable from each other. However, the present disclosure and the inventions herein are not limited to any particular design, shape or configuration of the material application device 10 or its constituent parts, including the design, shape or configuration of the handgrip portion 16, and may include machined parts, molded parts, combinations thereof, integrated portions and so on. In some descriptions herein, general reference may be made to a material application device body or device body, by which is meant any part or combination of parts that form portions or all of the structure of the application device, such as for example, the handgrip portion 16, the barrel portion 14 and the nozzle portion 12. The various inventions and inventive aspects of the disclosure may be realized in far too numerous ways and configurations of the handgrip portion 16, as well as the barrel portion 14 and nozzle portion 12 to identify and disclose herein.

The handgrip portion 16 may be realized, for example, in the form of a handle 18 that is manually held or gripped during operation of the spray gun 10. For electrostatic devices 10, the handle 18 may include a portion that contacts the operator's hand and is grounded. For purposes of this description, the term handgrip is generally used to refer to any structure or assembly or member that is manually held or gripped by an operator during operation of the application device 10 to support and control the device 10, with a handle, grip or other structure being exemplary embodiments of such a handgrip.

As illustrated in FIG. 1, a coating material supply 20 may be used as a source of coating material to the spray gun 10. A feed or supply hose 22 is commonly used to connect the spray gun 10 with the supply 20. A hose connector 24 may be provided to securely attach the supply hose 22 to the spray gun. In the case of an electrostatic spray gun as shown in FIG. 1, an electrical control cable or connection 26 may be provided between a control system 28 and an electrical input 30 of the spray gun. The control system 28 may also receive one or more signals from the spray gun 10, such as for example a trigger actuation signal that indicates that the operator has activated a first manually actuated device 32. In the exemplary embodiment, the first manually actuated device may be realized, for example, in the form of a main trigger or switch 32 to initiate a coating operation. The main trigger 32 may be designed so that an operator is able to actuate the trigger 32 using a finger of the same hand that the operator is using to hold the spray gun 10 via the handgrip portion 16. By 'main' trigger is simply meant that the primary function associated with the first trigger 32, but not necessarily the only function, is to control on/off operation of the spray gun for a coating operation. When the main trigger 32 is activated, an electrical signal or condition (such as closed contacts) is sent to or detected by the control system 28 to begin flow of coating material to the spray gun 10, and other signals may be generated to activate electrical power for the spray gun (in the case of electrostatic operation for example). In the exemplary embodiment, the electrical signal or condition that is associated with actuation of the main trigger 32 is coupled to and detected initially by a display controller 110 (see FIG. 4 herein), which will be explained in greater detail herein below. The display controller 110 communicates with the control system 28 over a network, so that the control system 28 detects actuation of the main trigger 32 via the display controller and network. Alternatively, the main trigger 32 actuation may be coupled to the control system 28 other than through the network, for example, by a wired or wireless connection directly between the main trigger 32 and the control system 28.

All electrical signals or conditions between the spray gun 10 and the control system 28 or other system components may be transmitted along electrical lines through the electrical cable 26. Alternatively, signals may be transmitted using wireless techniques including RF, IR optical and so on. In the embodiments herein that include the use of a network to link the material application device 10 with the control system 28, the network wiring (single wire or multi-wire) may also pass through the electrical cable 26.

The control system 28 may be any suitable arrangement as is well known in the art for controlling input power and operation of the spray gun electrical requirements, as well as controlling operation of the coating material supply 20, a purge supply 34 and other system related features such as a spray booth, parts conveyor and so on (not shown). The material supply 20 forms no part of the present inventions except as used in combination with the apparatus and methods as set forth herein. The coating material supply 20 typically includes a pump or pumps under the control of the control system 28 so that the control system 28 starts the pump in response to the operator actuating the trigger 32. This causes coating material to flow through the handgrip portion 18, the barrel portion 14 and out through the nozzle portion 12 to form a desired spray pattern S, typically in the form of a cloud like pattern for powder coating material, for example.

A purge supply 34 under the control of the control system 28 may be used to provide pressurized purge air or other gas through a purge hose 36 to the spray gun 10. The purge hose 36 may be connectable to a suitable hose connector input 38 disposed on the handgrip 16, and in this example a base 40 of the handle 18. The purge air inlet to the handgrip 16 may thus be separate from the coating material input at the hose connector 24, so that purge air initially enters a coating material flow path (not shown in FIG. 1) by first passing through a purge air flow path within the handgrip 16. The present inventions however are not limited to any particular purging arrangement or coating material flow path arrangement. For example, purge air may alternatively be introduced into the coating material flow path near or at the supply 20, or even up closer to the barrel portion or the nozzle portion 12, to name a few examples. The present inventions are also not limited to a coating material flow path that begins at the base of the handle 40. In many gun designs, the material flow path first enters the gun up at the barrel portion, for example.

Figure 2:
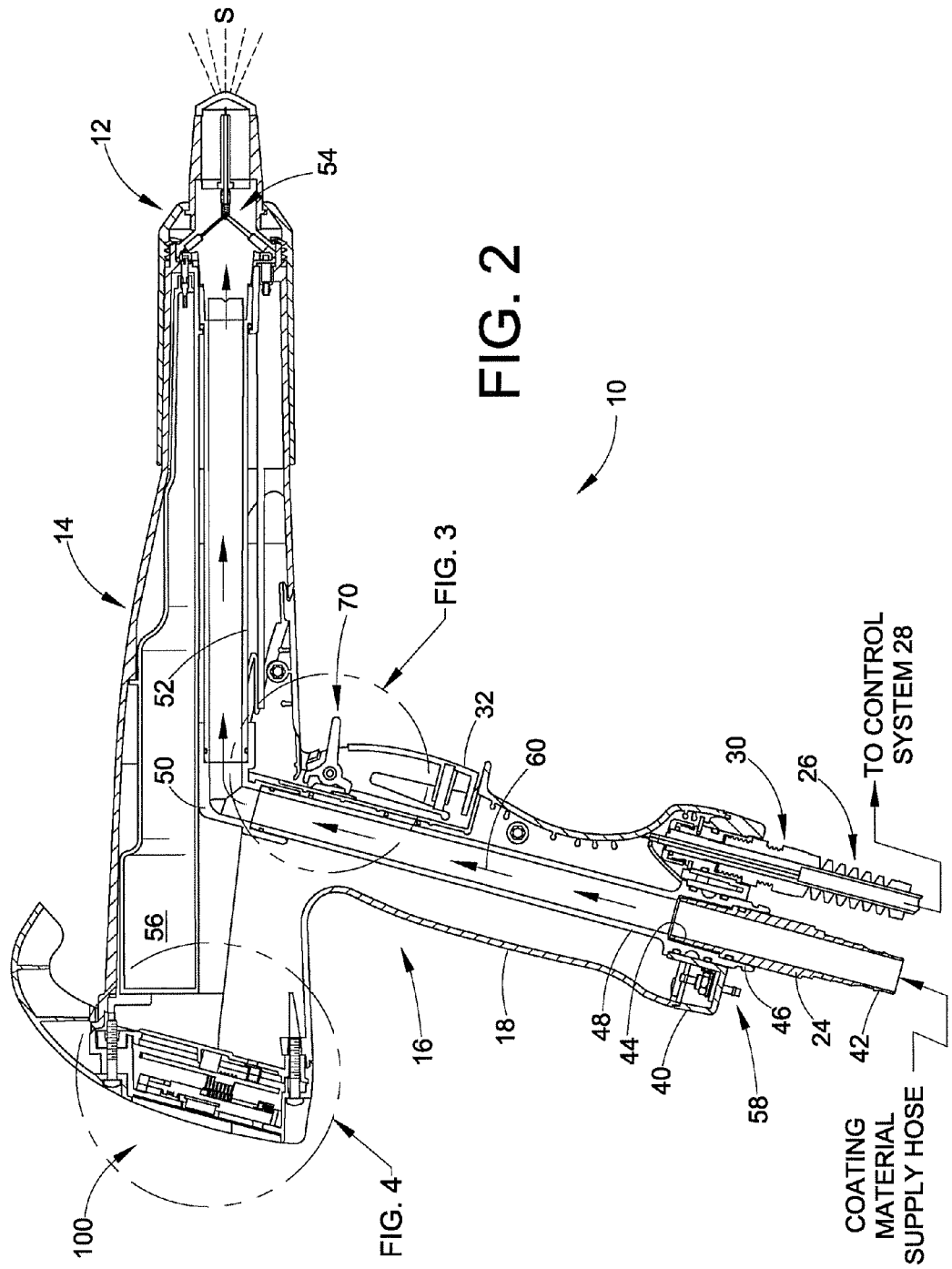
FIG. 2 is an elevation of the embodiment of the material application device of FIG. 1, shown in longitudinal cross-section.

FIG. 2 illustrates the application device 10 in longitudinal cross-section. As shown, the handle 18 may be ergonomically contoured to ease strain on the operator's hand during prolonged operation or shifts. The coating material hose connector 24 has a first end 42 adapted to receive one end of the supply hose 22 (not shown) and an opposite end 44 that telescopically slides into a first end 46 of an inlet tube 48.

The inlet tube 48 extends up through the handle 18 and mates, such as for example with a telescopic connection, with one end of an elbow adapter 50. The elbow adapter 50 has another end that mates with, such as for example with a telescopic connection, a first end of an outlet tube 52. The outlet tube 52 extends along the barrel portion 14 to the nozzle portion 12 so that coating material exits through the distal end of the outlet tube, and into and through the nozzle portion 12 to form the spray pattern S. The details of the nozzle portion 12 are not needed for understanding and practicing the inventions of this disclosure. In alternative designs, for example, the outlet tube 52 may itself form or provide an outlet orifice through which coating material exits the nozzle. In the exemplary embodiments herein, the nozzle portion 12 may include an electrode assembly 54 that is charged by an internal power supply section 56 in the rearward portion of the barrel 14. The supply 56 typically is realized in the form of a high voltage multiplier and related circuits as is well known. Many different types of electrode assemblies may be used, including electrode tips that are positioned outside the nozzle portion 12, as well as many different types of power supply designs, configurations and locations, including external power supplies and hybrid designs with portions of the power supply external the spray gun 10 and other portions internal the spray gun 10. An electrode air wash inlet 58 may be provided that is connectable to a source of pressurized air, with an air passageway (not shown) that extends up through the handle 18, along the barrel portion 14 and into the nozzle portion 12 so as to provide a flow of air across the nozzle tip to help prevent the accumulation of coating material on the nozzle tip.

The inlet tube 48, the elbow 50 and the outlet tube 52 thus combine to form or define a coating material flow path—in the exemplary embodiment being formed by the interior volume of the inlet tube 48, the elbow 50 and outlet tube 52 (and as represented by the arrows associated with the numeral 60)—that extends from the handle 18, along the barrel portion 14 to the nozzle portion 12.

In accordance with an inventive aspect of the present disclosure, a second manually actuated device 70 may be provided. This second manually actuated device 70 may be realized, for example, in the form of a second or auxiliary trigger or switch. Preferably, although not necessarily, the auxiliary trigger 70 may be finger actuated, and in particular with a finger of the operator's hand that is also holding the spray gun handle 18. Separate fingers may be but need not be used to actuate the first and second triggers 32, 70.

Figure 3:
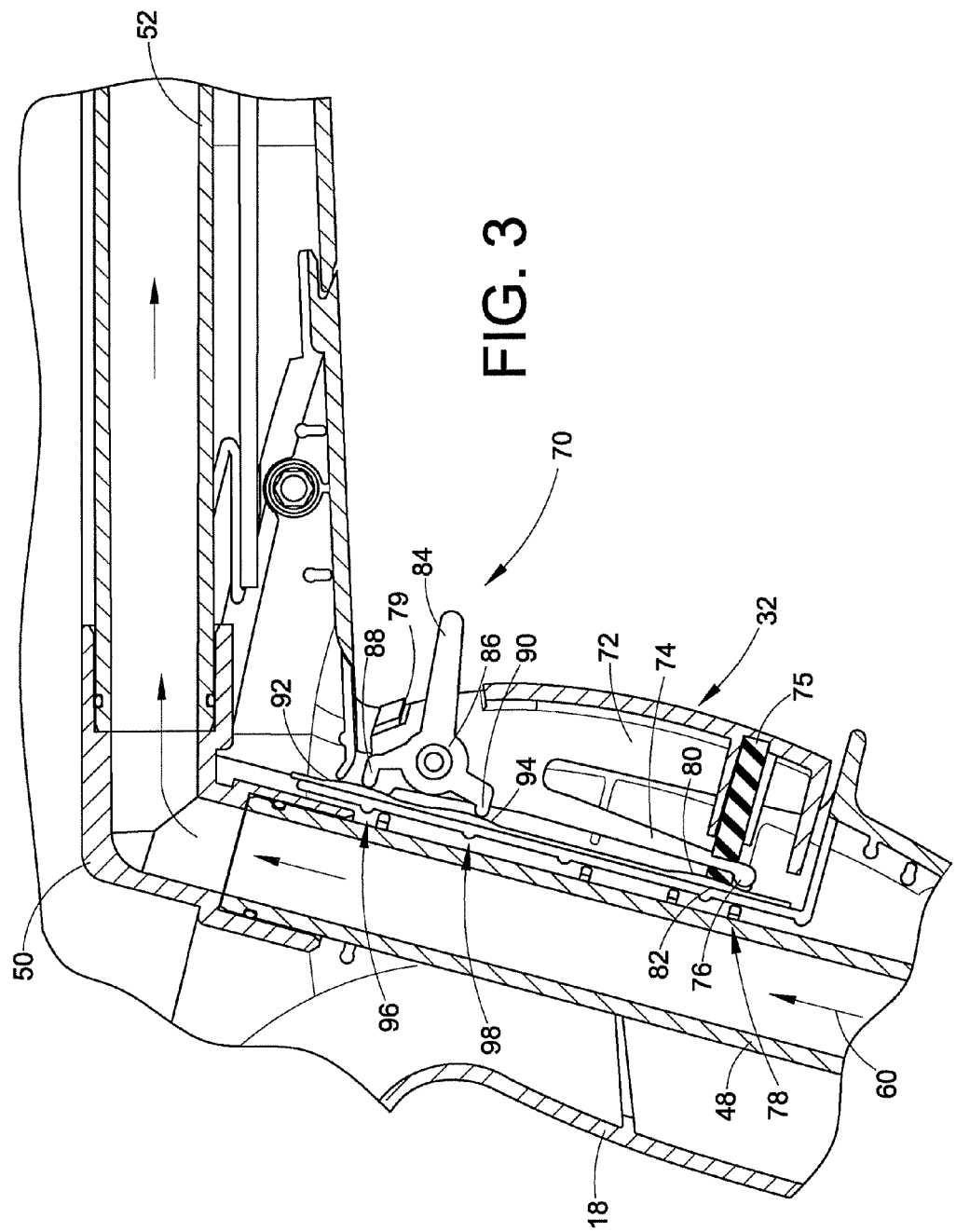
FIG. 3 is an enlarged view of the corresponding region circled in FIG. 2.
Figure 9A:
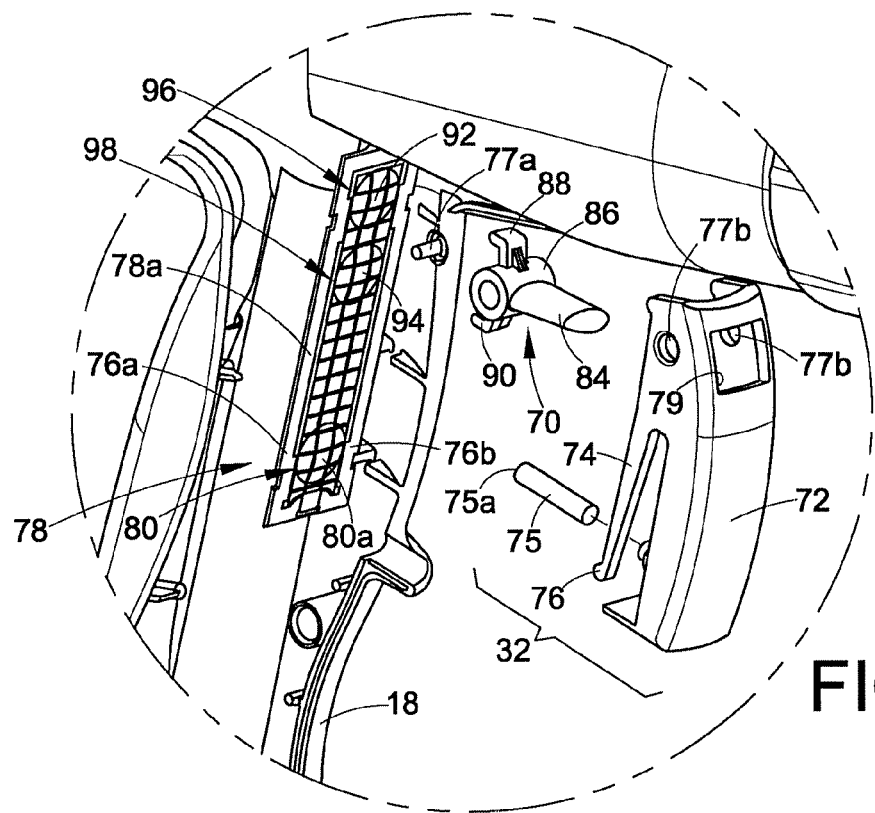
FIG. 9A is an exploded perspective of a trigger and switch arrangement for the embodiment of FIG. 1.
Figure 9B:
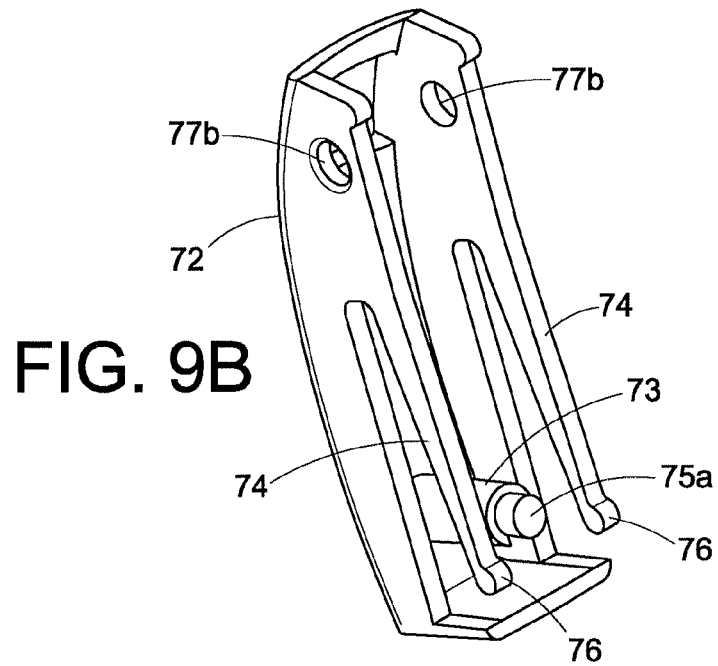
FIG. 9B is another view of the trigger member of FIG. 9A.

With reference to FIGS. 3, 9A and 9B, the main trigger 32 and the auxiliary trigger 70 may be operably coupled to actuate membrane switches or other suitable switch designs. The main trigger 32 in this example includes main trigger body 72 having a pair of flexible arms 74 extending therefrom. A distal end 76 of each flexible arm 74 engages one side of a membrane switch assembly 78, near a membrane switch 80 that is associated with the main trigger 32, such as at locations 76a and 76b on opposite sides of the membrane switch 80. The distal ends 76 may alternatively engage any other conveniently available surface that will provide adequate support so that the legs 74 may be compressed inward when the main trigger body 72 is pulled toward the handle 18 to actuate the main trigger 32.

In this example, the membrane switch assembly 78 includes three membrane switches 80, 96 and 98. The lower switch 80 may be used to detect actuation of the main trigger 32, which the upper two switches 96 and 98 may be used to detect actuation of the auxiliary trigger 70 (as will be further explained herein below). The various membrane switches may be disposed on a board 78a, although the membrane switches may be installed in the spray gun in any other convenient manner as desired.

The main trigger body 72 may further include an inwardly facing hollow boss 73 that receives and retains a softer actuating post 75. The actuating post 75 is sized so that when it is fully inserted inside the boss 73, and end portion 75a extends slightly out beyond the end of the boss 73. The end portion 75a engages the associated membrane switch 80 to actuate the switch 80 when the main trigger body 72 is pulled by the operator. The main trigger body 72 may be attached to the handle 18 by any convenient means, such as pivot posts 77a on the handle 18 (only one shown in FIG. 9A) and cooperating holes 77b on the main trigger body 72. The posts 77a may also be used to support the auxiliary trigger 70 on the handle 18. The main trigger body 72 may further include a window 79 through which the auxiliary trigger 70 may extend after assembly. In this manner, an operator may easily access both triggers 32 and 70 with one finger if so desired.

When the trigger 32 is pulled inward (leftward as viewed in FIGS. 3 and 9A, the distal end 75a of the actuating post 75 presses against a flexible contact portion 80a of the membrane switch 80, which makes electrical contact with a stationary contact portion 82 (FIG. 3). This electrical contact or connection provides an indication to the control system 28 to start a coating operation. When the trigger 32 is released by the operator, the spring like bias of the flexible arms 74 pushes the trigger body 72 back to its deactivated position shown in FIG. 3, withdrawing the post 75 far enough away from the switch 80 so that the flexible contact portion 80a snaps back or moves away from and out of contact with the stationary contact portion 82, thereby signaling to the control system 28 to stop a coating operation. When the main trigger 32 is released, the post 75 may but need not remain in actual contact with the flexible contact 80a.

The use of the post 75 has a number of advantages. Preferably, the post may be made of a softer material, such as rubber for example, so that the operator receives a softer tactile feedback for more comfort. By simply changing the relative hardness or softness of the post, the feel can be changed. The use of a soft post 75 such as rubber material also allows the post 75 to compress so as to reduce damage on the switch 80 due to over travel or excessive force applied to the trigger 32. The use of the two flexible arms 74 provides redundancy. Should one of the arms become damaged or break, the other arm will still allow the trigger 32 to function, and in particular will assure that the switch 80 is opened when the trigger 32 is released.

The auxiliary trigger 70 in this embodiment may be a dual switching device in which the auxiliary trigger 70 has a neutral or deactivated position illustrated in FIG. 3, a first actuated position and a second actuated position. However, the present inventions are not limited in any manner to a particular trigger configuration nor to a single auxiliary trigger. The auxiliary trigger may have more than two actuated positions, or there could be more than one such auxiliary trigger. As an example, the manually actuated device 70 may be a slide switch with multiple positions or a rotary switch with multiple positions, or a joystick with multiple positions, and so on. In any case, the auxiliary trigger/switch 70 design will be determined by the total functionality that is to be carried out by operator use of such devices.

The auxiliary trigger 70 may include a finger engageable lever 84 that extends from a central hub 86. The hub 86 may include a spring or other device (not shown) that normally urges the trigger 70 to the neutral position, meaning that a force needs to be applied to the trigger 70 in order to actuate a related switch. Extending from the hub 86 are first and second actuation arms 88 and 90 that may engage but need not engage respective flexible contacts 92 and 94 of respective upper and lower membrane switches 96 and 98 when the trigger 70 is in the neutral position. Thus, when the auxiliary trigger 70 is pivoted upward as viewed in FIG. 3, the first actuation arm 88 presses against its associated flexible contact 92 to close the upper membrane switch 96. Similarly, when the trigger 70 is pivoted downward as viewed in FIG. 3, the second actuation arm 90 presses against its associated flexible contact 94 to close the lower membrane switch 98. It should be noted that an operator may easily actuate the auxiliary trigger 70 while the main trigger 32 is either also actuated or when it is not actuated. The membrane switches 96, 98 when actuated indicate to the control system that a desired action or function is to occur. As with the main trigger switch 80, the corresponding electrical signals or conditions for the auxiliary trigger switches 96, 98 are communicated to the control system 28 via the display controller 110 and the network 112 (FIG. 1). Alternatively, these signals may be communicated in a wireless manner or through wires along the electrical cable 26.

For example, the control system 28 may include instructions such as in software or otherwise, that the up/down actuation of the auxiliary trigger 70 relates to a command to increment or decrement a coating operation parameter. Alternatively, the auxiliary trigger actuation may be used to scroll through a list of available choices for changing or selecting one or more coating operation parameters. Many other alternative functions and controls may be associated with actuation of the auxiliary trigger 70, far too many to list herein. Moreover, the functionality of the auxiliary trigger 70 may change for different operating modes of the spray gun 10 or the system. For example, during a coating operation, actuation of the auxiliary trigger 70 may increase or decrease material flow rate, but during a purge operation the trigger may be used for shutdown or standby modes. Additional features and functions will be described in greater detail herein below.

Figure 4:
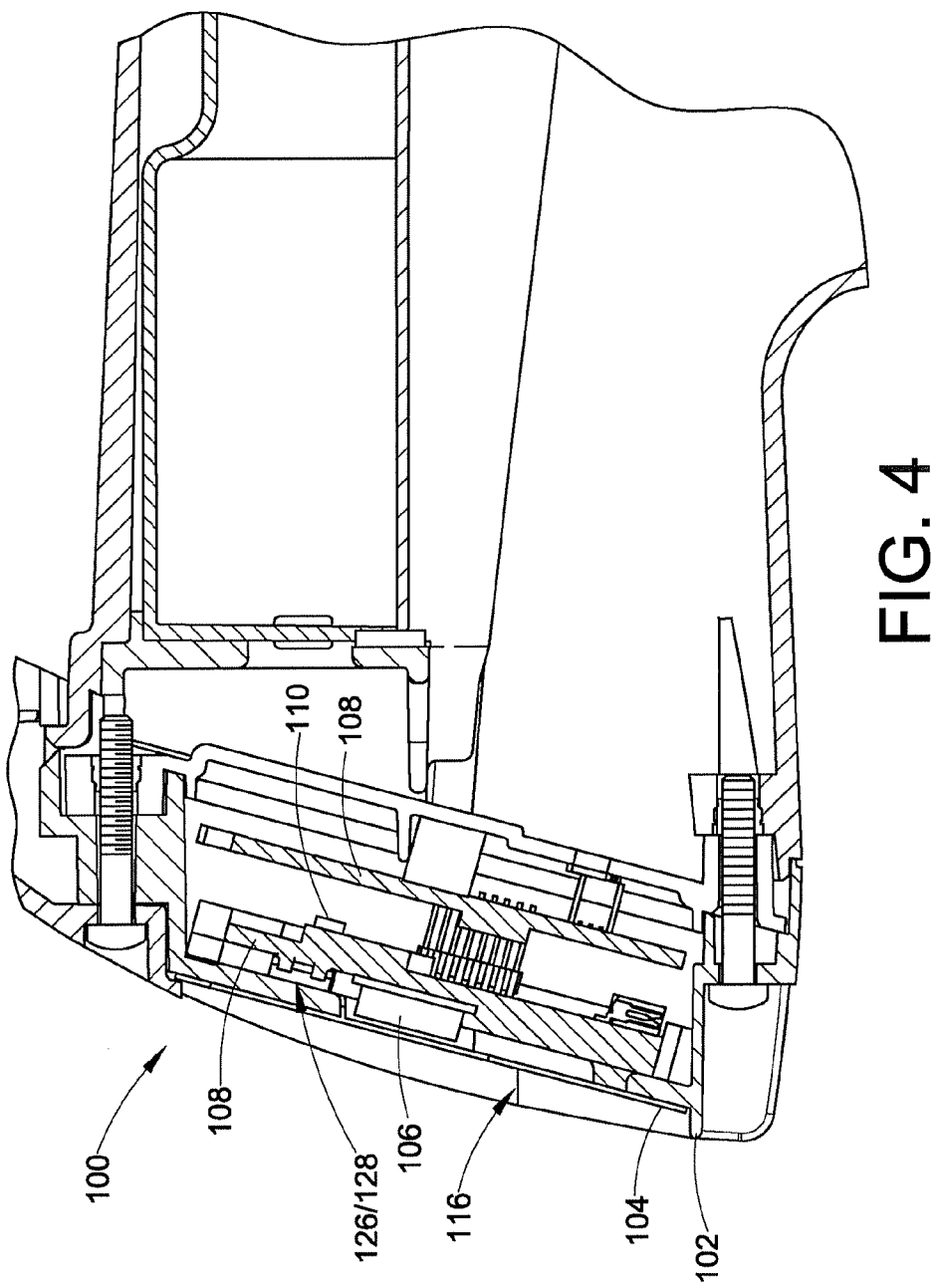
FIG. 4 is an enlarged view of the corresponding region circled in FIG. 2.

With reference to FIGS. 2 and 4, in accordance with another inventive aspect of the present disclosure, a visual information device, such as a display 100, is provided for presenting information to an operator concerning one or more operating parameters or other information about the spray gun 10, one or more of the system components such as the purge supply 34, the material supply system 20 and so on. Preferably, the display 100 is disposed on or with a portion of the spray gun. In the exemplary embodiment, the display 100 may be installed at the back end of the barrel portion 14, so as to be easily visible to an operator while the operator is using the spray gun.

The display 100 may be conveniently attached or recessed within the gun body, in this example just aft of the power supply section 56. A protective viewing collar 102 may be used so that the display is protected from adverse impact and contamination, and also perhaps in some situations more easily viewed. A protective lens or cover 104 may further be provided, and the lens 104 may include appropriate legends and markings for facilitating use of the display 100 as needed. The display 100 may further include a visual indicator device 106, such as a pair of seven segment LEDs for example, and one or more circuit boards 108 that may contain a display controller 110 and related and additional circuitry. The display controller 110 performs over all control functions for the display 100, and may also include a network interface so that the display controller 110 may communicate over a network 112 (see FIG. 1) with a main controller 114 associated with the control system 28. A suitable network may be a single wire network such as for example a LIN network (the single wire passing through the electrical cable 26 for example), but any network including multi-wire and wireless may alternatively be used as needed. In the exemplary embodiment, the display 100 may also include one or more manually actuated inputs 116, such as, for example, pushbutton membrane switches. The manual inputs 116, however, may alternatively be disposed elsewhere on the application device.

Figure 5:
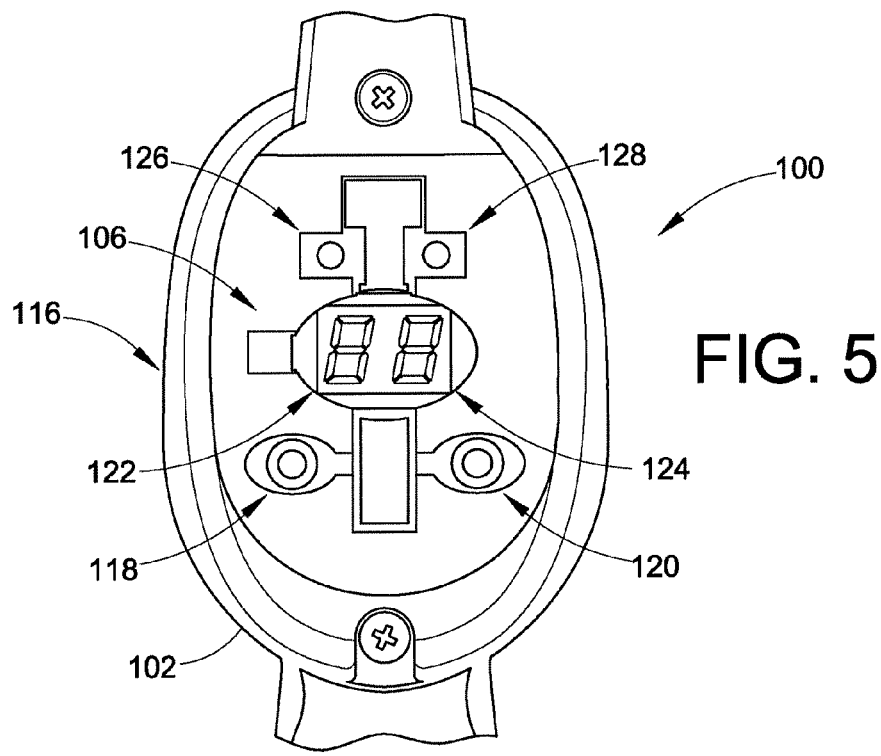
FIG. 5 is a rear view of the material application device of FIG. 1 showing a display.
Figure 6:
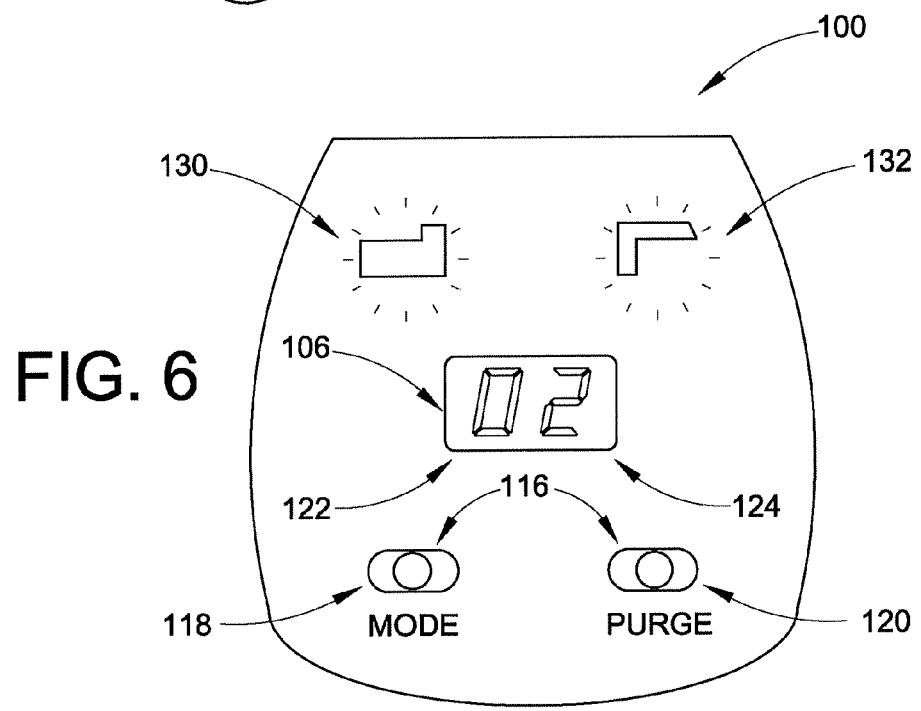
FIG. 6 is an exemplary and simplified illustration of a display as it might appear in use.

With reference to FIGS. 5 and 6, the display 100 manually actuated inputs 116 may include first and second pushbutton membrane switches 118 and 120, for example, although any switch or selector device may be used as needed. Also, the visual indicator device 106 may include first and second seven segment LED displays 122 and 124. Although the displays 122 and 124 in this example are numeric, other displays including alphanumeric, LCD and others may be used that are suitable to convey information desired to be displayed to an operator. Additional visual indicators may be used as desired. For example, first and second lamps, such as LED's, 126 and 128 may be used for illuminating associated icons 130 and 132 (FIG. 6).

As an example, one of the manually actuated inputs 116 may be used as a Mode selection switch 118. The other manually actuated input may be used as a Purge Start switch 120. When the Purge Start switch 120 is actuated, an indication is sent to the control system 28 over the network 112 and the control system 28 initiates a purge operation. When the Purge Start switch 120 is not activated, the system may be in a standby condition or a coating operation condition, or other condition as desired. Purge operations may be initiated in other ways besides use of the second input 120. For example, the control system 28 may be programmed to recognize that when the auxiliary trigger 70 is actuated, a purge operation begins. This allows an operator with one hand to control a coating operation and a purge operation. In such a case, the second input 120 may be programmed to perform another function, such as a system shutdown, a reset or any other desired action or operation.

The display 100 in some systems may have its own functionality for presenting information to an operator about any number or type of system related data and parameters. For example, the display controller 110 may be programmed to simply display material flow rate during a coating operation based on data received from control system 28 over the network 112. Material flow rate may be expressed, for example, in grams per minute, or as a percentage of maximum flow rate, to give two examples. Material flow rate may also be extrapolated from air flow values, such as flow air rate.

However, it is further contemplated that the display 100 may be used to greatly enhance the flexibility and functionality of the auxiliary trigger 70. Since the auxiliary trigger 70 may be a multiple input device, it may be used to control what information is displayed and to make selections from a listing of options. As an example, the Mode Select button 118 may be used to select different display modes for the display 100. In one embodiment, pressing the Mode switch 118 places the device in a flow rate mode which causes the second icon 132 lamp 128 to be illuminated. Pressing the Mode switch 118 again extinguishes the second icon 132 lamp and illuminates the lamp 126 for the first icon 130, which places the device in a Folder display mode. Each successive actuation of the Mode button toggles the display between Folder Mode and Flow Rate Mode.

In the Folder display mode, the operator may next use the auxiliary trigger 70 to scroll up and down or forward and backward through a list of coating operation preset recipes. Each actuation of the auxiliary trigger 70 presents a new preset number to the operator via the visual indicator device 106. In the example of FIG. 6, the display is in the Folder Mode, and preset 02 is being displayed. If the operator leaves the display at preset 02, then the control system 28 will initiate the desired operating parameters for that preset recipe. The operator does not need to necessarily know what all parameters and conditions will be adjusted for that particular recipe, only that this is the recipe either called for or that is working best for the particular coating operation.

Optionally, only preset numbers that actually have information associated with them need be displayed to the operator.

In the Flow Rate Mode, the associated icon 132 is illuminated so the operator knows which mode is being used. In this example, the visual indicator device 106 now may display flow rate for the coating material through the spray gun 10 This information for example may be sent from the control system 28 over the network 112 to the display controller 110. When in the Flow Rate Mode, the operator may actuate the auxiliary trigger 70 up and down as desired to increase or decrease the flow rate parameter. Since this functionality is independent of the main trigger 32, the operator can initiate these selections even while actually performing a coating operation or just prior to or after a coating operation, as the case may be.

The display 100 greatly enhances this functionality of the auxiliary trigger 70 because it allows the operator to visually observe the information related to the selected mode of operation, and in also to view options, make selections and view confirmation of the selections, without having to divert attention or field of view away from the spray gun 10 or the object being coated. This allows one or more operating parameters to be changed or selected without interrupting a particular coating operation, or at least without having to look away from the spray gun or coating area in order to implement such changes, selections and to confirm the selection made. For example, in the Flow Rate Mode, the operator can simply actuate the auxiliary trigger 70 up or down as needed to adjust or select flow rate during a coating operation to improve the product finish. Or the operator may switch preset recipes as a new object to be coated enters the coating area, or if the current preset is not adequately coating the object. Alternatively, the system may be programmed to allow selections, such as flow rates or preset recipe select or purge initiation for example, when the main trigger 32 is not actuated. Still further, the functions and controls that are associated with actuation of the auxiliary trigger 70 may be a function of whether the main trigger 32 is actuated or not, and further a function of what mode is selected via the manual inputs 116. For example, if the main trigger 32 is actuated, the auxiliary trigger will not be able to initiate a purge operation.

Thus, the combined functionality of the auxiliary trigger 70 and the display 100 allows an operator to control a coating operation including selection of one or more operating parameters using one hand if so desired, even the same hand that is being used to support or grip the spray gun, all without having to look away from the spray gun or the coating area to verify selections made.

There is no necessary limitation on the functions and parameter selections that may be programmed for the display 100 or the auxiliary trigger 70. Any functionality and parameter selections may be made available as needed for a particular system. Also, the use of additional auxiliary triggers or multi-position manual actuation devices can further increase the flexibility of the overall concepts described herein. As another example, although successive actuation of the auxiliary trigger 70 may be used to step through options or incremental changes for one or more coating operation parameters, flow rate for example, if the trigger is held down then the values may increment in greater steps or faster, for example.

The control system 28 may also include a main or system display 140 (FIG. 1) that may be used, for example, during system setup, calibration and so on. This display 140, however, may or may not be located close to the operator working area, or may not be visible to the operator during a coating operation. The gun mounted display 100 may present some or all of the same information presented back at the system display 140.

To name just a few examples of alternative functionality, by appropriate settings and programming if the control system 28 and the gun controller 110, the auxiliary trigger 70 may be used to: adjust charging voltage up and down; adjust current limits up and down; adjust the presets of all the guns in a system, including automatic guns, using a manual gun as a master; and to initiate purge operations or color change operations. Color change operations may include operations and functions such as, for example, supply changeover, various purging operations, spray booth cleaning operations, overspray recovery operations, gun blow off and so on.

These are but a few of the many programmable or selectable functions that may be assigned to the auxiliary trigger 70. Additional options are available for the manual inputs 116 that are on the display 100. For example, these manually actuated inputs may have functionality assigned to them or programmed such as preset recipe select; initiate purge operation; a disable button, automatic gun triggers, and multiple flow control modes. For flow control, two available and exemplary options are to use one of the manually actuated inputs 116 to present a choice of a traditional flow control mode or a total flow control adjustment mode. In the traditional flow control mode, the auxiliary trigger 70 may be used to adjust flow air or atomizing air settings independently of each other. For example, in one input 116 mode the auxiliary trigger 70 may be used to adjust flow air, and in another selected input 116 mode the auxiliary trigger 70 may be used to adjust atomizing air. In the total flow control mode, an operator may select a total air flow setting via an input function to the main controller 114 (or alternatively for example total air flow may be selected as part of a preset recipe selection). The total air flow parameter may for example be used to select the velocity of the coating material from the nozzle portion 12. The operator may then use the auxiliary switch 70 to select the percentage or ratio of the total air flow that is to be flow air and atomizing air to achieve desired coating material velocity, flow rate and/or film deposition. Adjusting the ratio, for example, will not change the velocity parameter but will change the amount of powder in the coating material cloud that is produced from the spray gun 10. The control system 28 then sets the appropriate atomizing air value and flow air value based on the two selected input values of total air flow and selected ratio.

It should be noted that reference herein to parameters and values should not be construed in a limiting sense. Parameters and values selected may be actual data points based on empirical or predicted analysis, but also may be numbers, values or other data or information that represent coating operation parameters as to performance, effects and results, rather than representing actual data points. For example, a preset recipe number can be thought of as a parameter or value that is selectable by the operator, but actually just represents or encodes one or more settings, values and so on for a coating operation. As another example, flow rate information presented to the operator on the display 100 may be actual flow rate values as measured, or may instead be identified as a scale, such as from 0% to 100% of total flow. Thus, the present disclosure should not be construed as requiring any particular format or code or representation of the coating operation parameter choices and selections or other information presented to the operator via the display 100 and selected via the manually actuated inputs 116 and auxiliary trigger 70.

Note that as the manual inputs 116 are selected for different functionality, the icons 130 and 132 may also be changed as appropriate to identify the functionality to the operator. For example, simple overlays may be used to change the icon figures that are illuminated by the lamps 126 and 128.

Still further, in the exemplary embodiment or others, the system main controller 114 communicates with the spray gun mounted display controller 110 via the network 112 or other suitable communication link. In such cases, the main controller 114 may be programmed to recognize revision levels or other software and database information that the display controller 110 is using, and may perform various programming functions, such as for example, upload updates to the display controller 110 as needed, or update or upload different programs that may be needed for particular applications and configurations.

Figure 7:
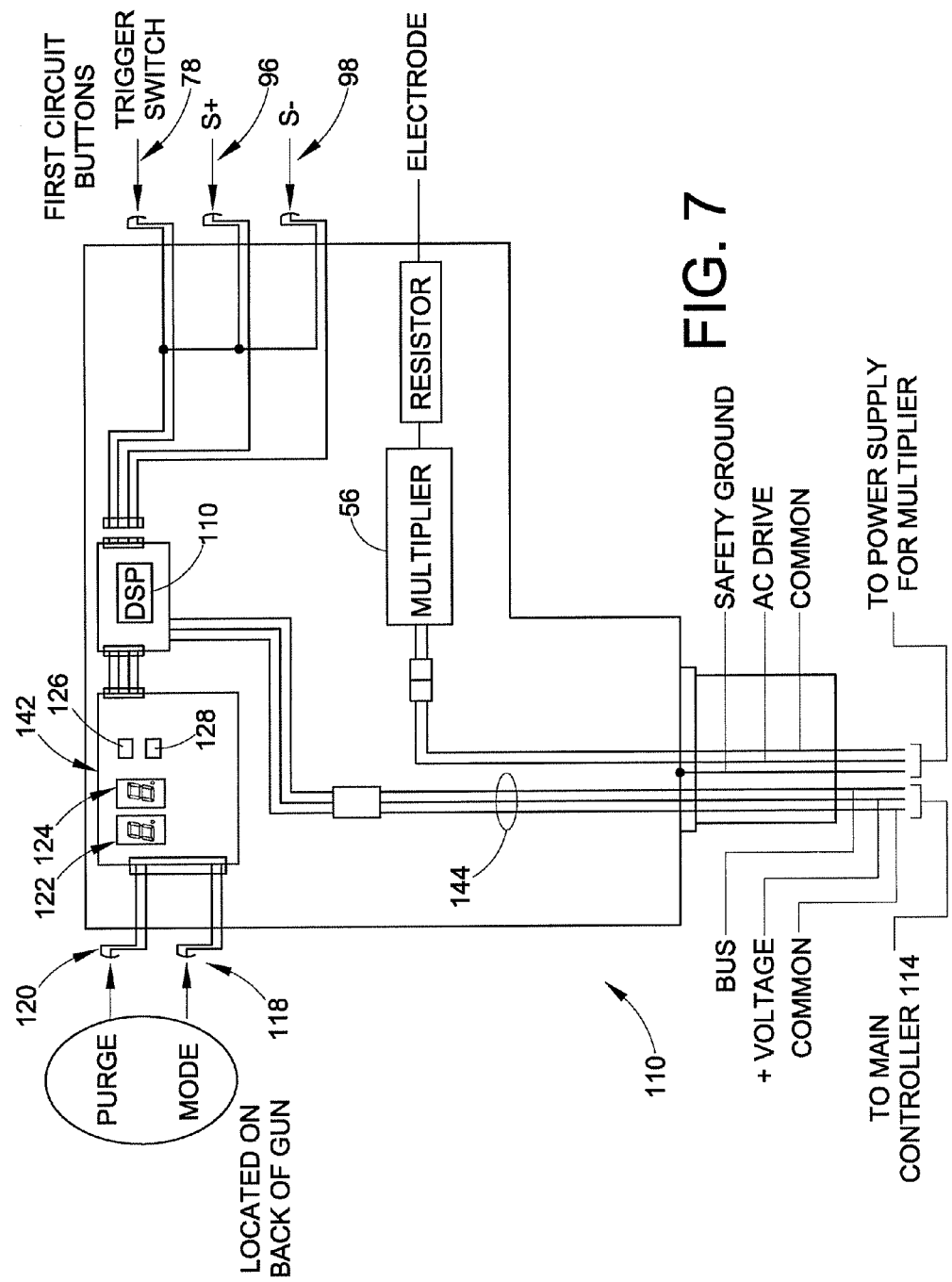
FIG. 7 is a functional block diagram of a display controller and related circuits.

With reference to FIG. 7, an exemplary embodiment of a display controller 110 and related circuits is illustrated. The display controller 110 may be any suitable controller, such as a DSP circuit, for example, or other microcontroller, microprocessor, discrete circuits and so on. Preferably the display controller 110 is programmable via software as is well known generally in the art of programmable circuits, with appropriate memory and other peripheral support circuits. The display controller 110 may be disposed on one of the circuit boards 108 (FIG. 4) and includes appropriate connections to the LED and display driver circuits 142. The display and driver circuit 142 may also receive as inputs the connections to the manually actuated inputs 118 and 120. The display controller 110 may receive the inputs from the main trigger switch 78 (FIG. 3) as well as the auxiliary trigger switches 96 and 98. The display controller 110 also provides communication with the control system 28 main controller 114 via wiring bundle 144 (the network 114 interface may be provided, for example, within the display controller 110 software and circuitry, and the main controller 114 may also have built in the necessary network interface functionality to communicate with the display controller 110).

Figure 8:
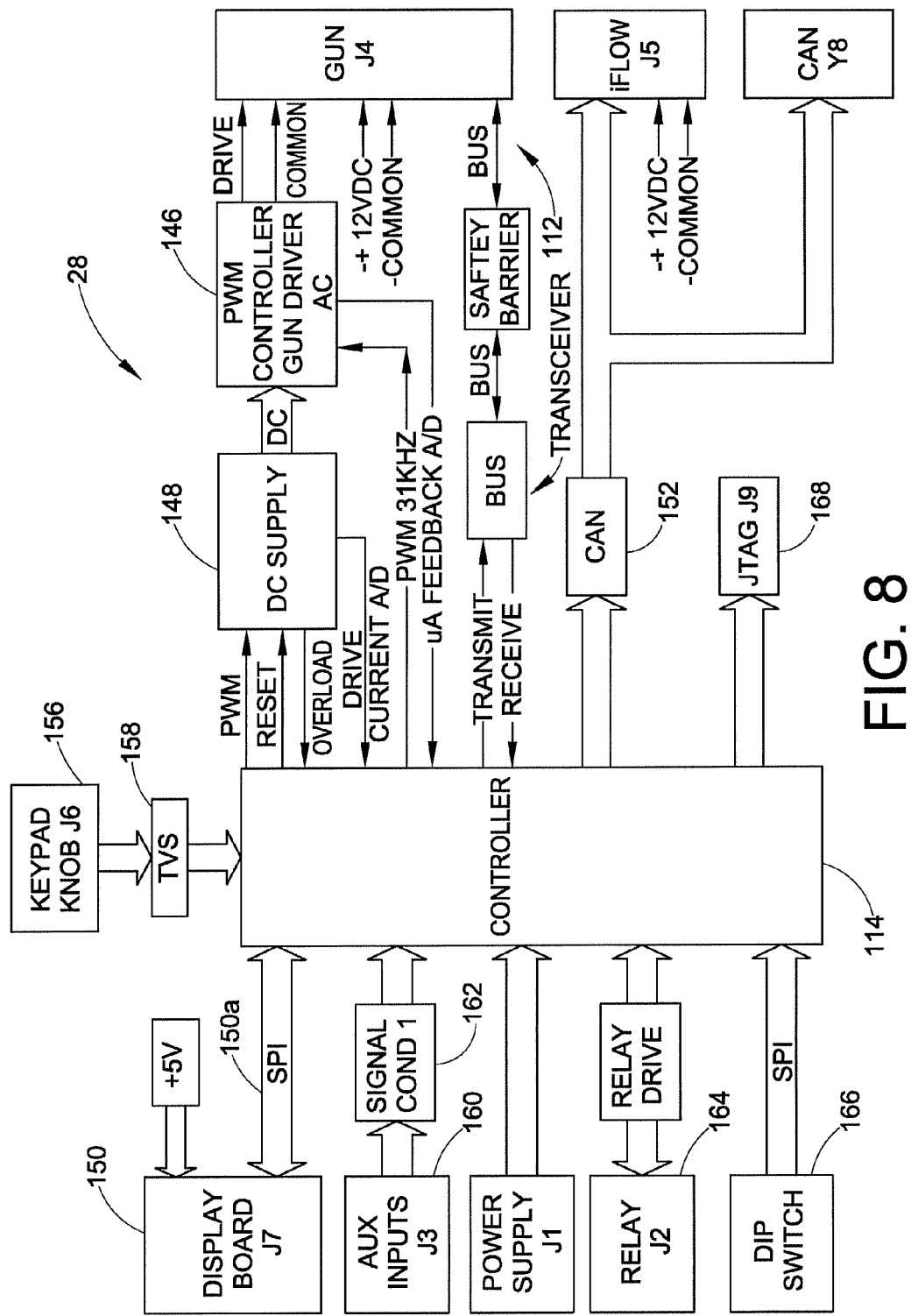
FIG. 8 is a functional block diagram of a system controller and related circuits.

With reference to FIG. 8, in one embodiment of the control system 28, the main controller 114 may be any suitable device such as for example, a DSP type controller, microcontroller, microprocessor, discrete circuits and so on, and known or later developed software, hardware and firmware programming may be used to implement the various functions and controls of the control system 28. The main controller 114 may interface with a Gun Driver circuit 146 and DC supply 148 that provides a drive signal to the spray guns associated with the control system 28. In this embodiment, the DC supply 148 is used to power a PWM drive signal for the spray guns. The main controller also interfaces with the network 112 for communication with the display controller 110. The main controller 114 also interfaces via a serial peripheral interface circuit 150a with a display driver circuit 150 for the system display 140 (FIG. 1). The spray gun display 100 may receive some or all or different display information as is presented on the main system display 140. For example, flow rates may be displayed on both, as well as selected preset numbers. How much common information is presented at the same time on both displays is a matter of design choice. Additional information that may be displayed on the spray gun display may include various warnings, alarms and so on.

The main controller 114 may also interface with a network 152 such as a CAN network for example, for systems that use multiple guns and other equipment interconnected by a communication network, as is known. Other interfaces may include an external input such as a keypad or input knob 156 to allow the operator to provide inputs to the controller 114. For example, it may be desired to adjust the recipe presets, or one or more individual parameters and controls assigned to a particular preset or presets. Since the external input 156 may produce voltage and current transients, a transient voltage suppression circuit 158 may be used as needed. Configurable (as in programmable or selectable) auxiliary external inputs 160 may include, for example, conveyor control, automatic gun trigger controls, fire detection signals and so on. Since these inputs may include field wiring noise and transient spike issues, it may be desirable to use signal conditioning circuits 162 such as opto-isolators for example to protect the main controller 114 from such effects. The main controller 114 may also interface with a vibratory box feeder via a relay circuit 164 to turn the vibrator on and off as needed. Still further, configuration switches such as DIP switches 166 may be used for external configuration selection of the control system 28, as well as an optional external programming interface 168. Many other or alternative interfaces and control and configuration options may be used as needed for a particular system, especially more complex systems that involves manual and automatic guns, advanced spray booth, powder recovery and gun mover designs, and so on.

The inventions have been described with reference to the exemplary embodiments. Modifications and alterations will readily occur to others upon a reading and understanding of this specification and drawings. It is intended to include all such modifications and alterations insofar as they come within the scope of the appended claims or the equivalents thereof.

The invention claimed is:

1. A coating material spray gun, comprising:
   a handle that is manually gripped with one hand by an operator during a coating operation,
   a trigger mounted on the handle, the trigger comprising a main body and a boss extending from the main body, and
   a compressible member that is coupled to the boss and that is at least partially located between the handle and the trigger that engages a switch when the trigger is actuated.

2. The coating material spray gun of claim 1, wherein the trigger further comprises two flexible arms extending from the main body, the flexible arms causing the main body to return to a non-actuated position when the trigger is released by an operator.

3. The coating material spray gun of claim 2, wherein each of the flexible arms is able to move the main body to a non-actuated position when the other arm is broken.

4. The coating material spray gun of claim 1, wherein the trigger mounted on the handle is a first trigger that is actuated by the one hand to start and stop the coating operation.

5. The coating material spray gun of claim 4, further comprising a second trigger mounted on the handle that is actuated by the one hand.

6. The coating material spray gun of claim 5, further comprising a display disposed on or with a portion of the coating material spray gun.

7. The coating material spray gun of claim 6, wherein the second trigger is actuated to change a coating operation parameter displayed on the display.

8. The coating material spray gun of claim 6, wherein two or more sets of coating material parameter values are displayed on the display, and wherein the second trigger is actuated to select one of the two or more sets of coating material parameter values.

9. The coating material spray gun of claim 8, wherein the second trigger is actuated to scroll through the two or more displayed sets of coating material parameter values to select one of the two or more sets of coating material parameter values.

10. The coating material spray gun of claim 6, wherein the second trigger has a neutral position, a first actuated position and a second actuated position.

11. The coating material spray gun of claim 10, wherein the second trigger is configured to be moved to the first actuated position to scroll in a first direction through the displayed two or more sets of coating material parameter values, and is configured to be moved to the second actuated position to scroll in a second direction, which is opposite the first direction, through the displayed two or more sets of coating material parameter values.

12. The coating material spray gun of claim 10, wherein the second trigger is configured to be pivoted in one direction to the first actuated position and pivoted in the opposite direction to the second actuated position.

13. The coating material spray gun of claim 10, wherein the second trigger is configured to be moved to the first actuated position to increase a flow rate of coating material through the coating material spray gun and is configured to be moved to the second actuated position to decrease the flow rate of coating material through the coating material spray gun.

14. The coating material spray gun of claim 10, wherein the second trigger is configured to be moved between the neutral position and the first and second actuated positions to change a value of a coating operation parameter.

15. The coating material spray gun of claim 5, wherein the second trigger is used to increase and decrease the flow rate of coating material through the coating material spray gun.

16. The coating material spray gun of claim 5, wherein the second trigger is actuated by the one hand to select one or more coating operation parameter values.

17. A coating material spray gun, comprising:
a handle that is manually gripped with one hand by an operator during a coating operation;
a trigger mounted on the handle having a main body and two flexible arms extending from the main body, the flexible arms configured to cause the main body to return to a non-actuated position when the trigger is released by an operator; and
a compressible member mounted on the trigger, the compressible member being longitudinally compressible.

18. The coating material spray gun of claim 17, wherein each of the flexible arms is able to move the main body to a non-actuated position when the other arm is broken.

19. The coating material spray gun of claim 17, wherein the compressible member is between the handle and the trigger and engages a switch when the trigger is actuated.

20. The coating material spray gun of claim 1, wherein the compressible member is longitudinally compressible.

* * * * *